(12) United States Patent
Mazor et al.

(10) Patent No.: US 7,504,449 B2
(45) Date of Patent: Mar. 17, 2009

(54) FLAME RETARDANT COMPOSITIONS

(75) Inventors: Royi Mazor, Beit-Kama (IL); Itzhak Shalev, Beit-Gamliel (IL); Asher Shoshan, Beer-Sheva (IL); Michael Peled, Beer-Sheva (IL)

(73) Assignee: Bromine Compounds Ltd., Beer-Sheva (IL)

( * ) Notice: Subject to any disclaimer, the term of this patent is extended or adjusted under 35 U.S.C. 154(b) by 0 days.

(21) Appl. No.: 11/709,726

(22) Filed: Feb. 23, 2007

(65) Prior Publication Data

US 2007/0197112 A1   Aug. 23, 2007

Related U.S. Application Data

(60) Provisional application No. 60/775,785, filed on Feb. 23, 2006.

(51) Int. Cl.
*C08G 73/12* (2006.01)
*C08K 3/02* (2006.01)

(52) U.S. Cl. .................. 524/369; 524/464; 524/465; 524/466

(58) Field of Classification Search ............ 524/369, 524/464–466
See application file for complete search history.

(56) References Cited

U.S. PATENT DOCUMENTS

| 4,385,131 A * | 5/1983 | Fracalossi et al. ............. 521/55 |
| 4,666,960 A * | 5/1987 | Spain ......................... 523/179 |
| 2005/0153610 A1 * | 7/2005 | McCarthy .................... 442/59 |

FOREIGN PATENT DOCUMENTS

| EP | 0390042 | 10/1990 |
| WO | WO 03/064361 | 8/2003 |
| WO | WO 03/070685 | 8/2003 |
| WO | WO 2006/008738 | 1/2006 |
| WO | WO 2006/013554 | 2/2006 |
| WO | WO 2007/096883 | 8/2007 |

* cited by examiner

*Primary Examiner*—Lynda Salvatore

(57) ABSTRACT

Novel formulations comprising pentabromobenzylbromide (PBBBr) and a carrier, for use as a flame retardant for application on a substrate, and processes for their preparation are disclosed. Further disclosed are articles-of-manufacture having these formulations applied thereon, and the use of PBBBr as a flame retardant for application on a substrate. These novel formulations are particularly effective as flame retardants for textiles, and are characterized by a low add-on and a high washing fastness.

39 Claims, No Drawings

FLAME RETARDANT COMPOSITIONS

RELATED APPLICATIONS PARAGRAPH

This Application claims the benefit of U.S. Provisional Patent Application Ser. No. 60/775,785, filed Feb. 23, 2006, the contents of which are hereby incorporated in its entirety.

FIELD AND BACKGROUND OF THE INVENTION

The present invention relates to the field of flame retardants (FRs) and, more particularly, to novel flame retardant compositions that are highly beneficial for use in textiles.

Textiles are an essential part of everyday life and are found, for example, in draperies, cloths, furniture and vehicle upholsteries, toys, packaging material and many more applications. Consequently, textile flammability is a serious industrial concern.

The flammability of fabrics is typically determined by the nature of the fiber comprising the fabric. Thus for example, some synthetic fibers, such as melamine, polyaramides, carbonized acrylic, and glass, are inherently flame resistant, whereby others, such as cotton, polyester and linen, can readily ignite. For those, the degree of flammability varies according to the fiber type and characteristics. For example, a textile made of a blend of fibers usually burns faster and to higher temperatures compared with each fiber type alone. Fabric flammability also depends on the fabric thickness and/or looseness.

The term "fiber" as defined hereinafter refers to a natural or synthetic filament capable of being spun into a yarn or made into a fabric.

The terms "fabric", "textile" and "textile fabric" are used herein interchangeably to describe a sheet structure made from fibers.

Several approaches have been proposed heretofore for minimizing the fire hazard of flammable textiles:

One approach involves fiber copolymerization: several fiber monomers are mixed and copolymerized, thus improving the properties of a certain fiber (e.g., a flammable fiber) through the enhanced properties of another fiber (e.g., a fire resistant fiber). However, this technique is limited by the number of existing fibers and their properties, and cannot be tailor-made for any substrate or requirements. Furthermore, fiber types and fiber polymerization types are not necessarily compatible, thus further limiting the applicability of this technique. An additional disadvantage of this approach is the high cost of the fire resistant fibers.

Another approach involves the introduction of flame retardants (FR) in or on the fabric, using one of two methodologies:

(i) Chemical post treatment: the fabric is treated with flame retardant chemicals after it has been produced, either by coating the fabric, or by the introduction of the FR into the fabric during the final dyeing process. The flame retardant can be applied to the back of the fabric (termed "back-coating") or to its front (termed "front-coating"), depending on the specific fabric application. For example, for draperies, furniture upholstering garments and linen, where the aesthetic appearance of the front side of the fabric is most important, back-coating is desired.

A disadvantage of this methodology is the common need to apply the protective coating in large amounts (commonly termed "high add-on") in order to obtain the required flame-resistant characteristics. Often, such high add-on adversely affects otherwise desirable aesthetical and textural properties of the fabric. Thus, for example, upon application of a FR, fabrics may become stiff and harsh and may have duller shades and poor tear strength and abrasion properties.

(ii) Fiber-additive matrix (also termed "compounding"): the FR is linked to the fiber during the melt spinning process, such that a fiber-additive molten plastic matrix is formed. This methodology has many drawbacks: (i) degradation of the FR agent due to the high extrusion temperatures, (ii) reaction of the FR agent with the extruded fiber, and subsequent modification of the fiber properties, such as fiber dyeability, fiber processability or other physical properties of the fiber, and (iii) reaction of the FR agent with the various polymeric additives, such as dyes or catalysts.

Another classification of FRs is according to the type of bonding between the FR and the fiber: a flame retardant is termed "additive" when it is mixed into, but not chemically reacted or bound to the fiber material. "Additive" FRs often easily migrate into the environment. A flame retardant is termed "reactive" when it is chemically inserted into the structure of the fiber material. "Reactive" FRs are bound to the fabric and hence do not easily migrate from the product into the environment and furthermore, typically do not degrade the physical properties of the fiber.

Another serious problem in designing flame retardant fabrics, is fabric smoldering, which is particularly critical in fabrics that contain a high ratio of cellulose (such as, for example cotton, viscose, linen or other vegetable fibers).

Thus, while some textiles may be resistant to open flame burning, the smoldering (also termed "after flame"), which may persist after the open flame has been extinguished, can eventually lead to complete digestion of the fabric (see, for example, "Toxicological Risks of Selected Flame-Retardant Chemicals-2000", Donald E. Gardner (Chair), Subcommittee on Flame-Retardant Chemicals, Committee on Toxicology, Board on Environmental Studies and Toxicology, National Research Council). Obviously, this leads to failure in many standard flammability tests (see, for example, U.S. Pat. Nos. 3,955,032 and 4,600,606; and V. Mischutin, "Nontoxic Flame Retardant for Textiles" in J. Coated Fabrics, Vol. 7, 1978, pp. 308-318).

Although one solution to this problem is coating the textile fabric with an impermeable material, obviously the feel of such a product is greatly damaged.

Accordingly, in order to overcome the smoldering problem in textiles, the addition of a smoldering suppressant (SS), which is also referred to herein, interchangeably, as a smoldering suppressing agent, is frequently required, in addition to the flame retardant agent.

Selecting the suitable flame retardant and/or smoldering suppressant, and the suitable methodology for applying it to the fabric largely depends on the substrate which has to be protected: the protection of a garment, or the protection of an electrical appliance will inherently pose different requirements and restrictions of the flame retardant used.

When used in textiles, an applied flame retardant has to be: (a) compatible with the fabric, (b) non-damaging to the aesthetical and textural properties of the fabric, (c) transparent, (d) light stable, (e) resistant to extensive washing and cleaning, (f) environmentally and physiologically safe, (g) of low toxic gas emittance, and (h) inexpensive. Above all, a flame retardant should pass the standard flammability tests in the field.

Properties of the FR such as stability to UV light, heat, water, detergents and air-pollutants, as well as chemical stability, may be summed-up under the term "durability". The most durable textiles are those which are inherently flame retardant, or which contain reactive (chemically bound) FRs.

In the latter, the degree of durability depends on the strength of the bonds between the flame retardant formulation and the fiber. Additive (mixed) FRs, or chemically applied FRs which are water-soluble, are considered less durable. Furthermore, topically applied FR agents are generally not as durable as those which are incorporated into the fabric during the extrusion of the fiber. Thus, the topically applied FR agent may be washed off during the laundry cycle, and in these cases the expensive and burdensome dry cleaning of the textile has to be used. Currently, there are no clear-cut standards to define fabric durability, and it is commonly defined as a fabric meeting its performance standard after 5, 10 or 50 washes.

Presently, there are four main families of flame-retardant chemicals:

Inorganic flame retardants (such as aluminum oxide, magnesium hydroxide and ammonium polyphosphate);

Halogenated flame retardants, primarily based on bromine and chlorine;

Organophosphorus flame retardants, which are primarily phosphate esters; and

Nitrogen-based organic flame retardants.

Bromine-containing compounds have been long established as flame retardants. For example, U.S. Pat. Nos. 3,955,032 and 4,600,606; and Mischutin ["Nontoxic Flame Retardant for Textiles" in J. Coated Fabrics, Vol. 7, 1978, pp. 308-318] teach flame retardation of textiles using formulations containing aromatic bromine compounds which are adhered to the substrates by means of binders.

The use of aromatic bromines as FRs for textiles, however, suffers major disadvantages including, for example, high bromine content demand, high dry add-on and/or binder demand, and a need to add compounds which enhance the flame retardancy (hereinafter termed a synergist). In addition, application of such FRs on fabrics may result in streak marks on dark fabrics, excessive dripping during combustion of thermoplastic fibers, relatively high level of smoldering and a general instability of the flame retardant dispersion which may prevent a uniform application thereof on the fabric. Most of these drawbacks are inherent to the aromatic bromine compounds currently in use [see, for example, "Toxicological Risks of Selected Flame-Retardant Chemicals-2000", Donald E. Gardner (Chair) Subcommittee on Flame-Retardant Chemicals, Committee on Toxicology, Board on Environmental Studies and Toxicology, National Research Council].

Using existing bromine-containing FR formulations, a dry add-on of 60% or higher (compared to the dry fabric weight) is often required to obtain satisfactory flame retardation. This high add-on is due in part to the large amount of binder needed to affix the FR agents to the textile. The binder used in bromine-containing formulations typically constitutes about 50% by weight of the total FR formulation [Toxicological Risks of Selected Flame-Retardant Chemicals, page 506-507, V. Mischutin, Nontoxic Flame Retardant for Textiles, J. Coated Fabrics, Vol. 7, 1978, p. 315] and due to its substantial presence, contributes in itself to flammability and dripping, thus requiring even higher loading of bromine and creating an inefficient cycle. Furthermore, brominated FR formulations often suffer from storage instability.

Ongoing research has therefore been conducted in order to obtain flame-retardants with improved performance, which are less detrimental to textile properties. Research has been particularly focused on providing an efficient FR which requires low binder content and is characterized by good dispersion properties.

Recently, it has been shown that formulations combining phosphates and halogens display a synergism in flame retardation [E. S. Lee, "Possible Phosphorous Synergy in Polyester-Cotton Fabric Treated with Tetrabromobisphenol A and Diammonium Phosphate" in J. App. Pol. Sci., Vol. 84, 2002, pp. 172-177]. It has further been shown that phosphate and borate compounds are efficient solid phase flame retardants during combustion (G. Camino, M. P. Luda, "Fire Retardancy of Polymers: The use of Intumescents", M. Le Bras, G. Camino, S. Bourbigot, R. Delobel, The Royal Society of Chemistry, 1888, p. 48, R. Dombrowski, Formulating Flame Retardant Coatings, Coated Fabrics Technology, Clemson University, 1998).

Compositions which combine compounds containing aromatic bromine atoms and compounds containing aliphatic bromine atoms are characterized by a broader temperature range for flame retardation, since the different bromine atoms react at different temperatures. This broader range creates more efficient flame retardation and hence, lower add-on of these compounds is required. An example of such flame retardant compositions is described in WO 05/103361, which is incorporated by reference as if fully set forth herein, and includes a combination of tris(tribromophenyl)triazine and tetrabromobisphenyl A-bis(2,3-dibromopropyl ether).

Combining the two bromine types within a single compound, has additional obvious advantages, such as reduced handling, enhanced compatibility, and less dispersion and application complexities.

Pentabromobenzylbromide (PBBBr) is an exemplary compound containing both an aromatic bromine and a benzylic bromine.

WO 06/008738 teaches a process for the preparation of highly pure PBBBr and its use as a co-flame retardant in the preparation of FR expanded polystyrene foams (EPS). WO 06/013554 teaches a styrenic polymer composition comprising a flame retardant, such as PBBBr and analogs thereof. These patent applications, however, fail to teach the use of PBBBr as a flame retardant for application on textiles, in which, as stated above, binders are often required so as to achieve the desirable results.

Japanese Patent No. 47032298 teaches the use of PBBBr as a flame retardant that is incorporated to the fabric by melt spinning with polyester fibers.

In all of these examples, PBBBr was used as a flame retardant or as a co-flame retardant incorporated within the polymer in the melt. As detailed above, it is preferred to apply the flame retardant topically on the fabric, thereby avoiding the thermal degradation of the FR agent during melting, as well as preventing the adverse effect of the FR agent on the processability and on other properties of the fiber. However, as is further detailed above, it is difficult to topically apply an FR agent to textiles since topically applied FRs are easily washed off during the laundry cycle.

It is therefore not surprising that PBBBr has never been prepared as a part of a coating or finishing formulation, and has been only known to be directly incorporated into the polymeric fiber, where it was used either alone or in combination with other flame retardants.

There is thus a widely recognized need for, and it would be highly advantageous to have, novel flame retardant formulations devoid of the above limitations.

SUMMARY OF THE INVENTION

According to one aspect of the present invention there is provided a formulation comprising pentabromobenzylbromide (PBBBr) and a carrier, the formulation being packaged in a packaging material and identified in print in or on said packaging material for use as a flame retardant for application on a substrate.

According to further features in preferred embodiments of the invention described below the formulation further comprises a binding agent.

According to still further features in the described preferred embodiments the binding agent is selected from the group comprising of an acrylate, a polyurethane, or a polyvinyl chloride (PVC).

According to still further features in the described preferred embodiments the concentration of the binding agent is less than 20 weight percentages of the total weight of the composition. Preferably, the concentration of the binding agent is less than 10 weight percentages of the total weight of the composition.

According to still further features in the described preferred embodiments the formulation further comprises at least one additional flame retardant and/or smoldering suppressant. Preferably, the additional flame retardant is selected from the group consisting of a halogenated flame retardant and a non-halogenated flame retardant. More preferably, the additional flame retardant is selected from the group consisting of a brominated flame retardant, a chlorinated flame retardant, a modacrylic, a polyhaloalkene, an organophosphorus compound, a melamine, a polyaramide, a carbonized acrylic and glass. Yet more preferably, the additional smoldering suppressant is an ammonium phosphate or decabromodiphenyloxide (DECA).

According to still further features in the described preferred embodiments the weight ratio between PBBBr and the additional flame retardant ranges from about 1:50 and 50:1. Preferably the ratio ranges from about 1:10 and 10:1. More preferably the ratio ranges from about 1:5 and 5:1.

According to still further features in the described preferred embodiments the formulation further comprises at least one fire retardant synergist.

According to still further features in the described preferred embodiments the at least one additional fire retardant synergist is antimony oxide (AO).

According to still further features in the described preferred embodiments, a molar ratio between the fire retardant synergist and PBBBr ranges from 1:1 to 1:10. Preferably the ratio ranges from 1:3 to 1:6. Preferably, this ratio is about 1:6.

According to still further features in the described preferred embodiments the formulation further comprises at least one additional ingredient selected from the group consisting of a surface active agent, a wetting agent, a dispersing agent, a suspending agent, an antifoaming agent, a preservative, a stabilizing agent, a pH buffer, a binding agent, a thickening agent, a salt, an oxide and any mixture thereof.

According to still further features in the described preferred embodiments the salt is ammonium phosphate, more preferably a metal ammonium polyphosphate.

According to still further features in the described preferred embodiments the oxide is sodium silicate.

According to still further features in the described preferred embodiments the oxide is alumina oxide.

According to still further features in the described preferred embodiments the carrier is selected from the group consisting of an aqueous carrier, an organic carrier and a combination thereof. Preferably the carrier is an aqueous carrier.

According to still further features in the described preferred embodiments the formulation is in a form of dispersion.

According to still further features in the described preferred embodiments the dispersion comprises a plurality of PBBBr particles having an average size lower than 100 microns. Preferably the average size is lower than 50 microns. More preferably the average size is lower than 10 microns, and yet more preferably, the average size ranges from about 0.1 microns to about 3 microns.

According to still further features in the described preferred embodiments the formulation is stable for at least two weeks upon storage at room temperature. Preferably the formulation is stable for at least four weeks upon storage at room temperature. More preferably, the formulation is stable for at least six months upon storage at room temperature.

According to still further features in the described preferred embodiments the formulation is stable at least one week upon storage at elevated temperatures.

According to still further features in the described preferred embodiments the substrate comprises a textile fabric.

According to still further features in the described preferred embodiments the textile fabric is selected from the group consisting of synthetic textiles, natural textiles and blends thereof.

According to still further features in the described preferred embodiments the textile fabric is selected from the group consisting of wool, silk, cotton, linen, hemp, ramie, jute, acetate fabric, acrylic fabric, latex, nylon, polyester, rayon, viscose, spandex, metallic composite, carbon or carbonized composite, and any combination thereof. Preferably the textile fabric is selected from the group consisting of cotton, polyester, and any combination thereof.

According to still further features in the described preferred embodiments the substrate is selected from the group consisting of a drapery, a garment, linen, a mattress, a carpet, a tent, a sleeping bag, a toy, a decorative fabric, an upholstery, a wall fabric, and any other technical textile.

According to another aspect of the present invention there is provided an article-of-manufacture comprising a flammable substrate and the flame retardant formulation of the described preferred embodiments being applied thereon.

According to still further features in the described preferred embodiments the article-of-manufacture is characterized by an after flame time, as defined by ASTM D 6413 12 seconds ignition test, of less than 2 seconds, preferably, of less than 1 second.

According to still further features in the described preferred embodiments, such an after flame time remains substantially unchanged upon subjecting the article-of-manufacture to one or more washing cycle, more preferably, to five or more washing cycles, and even more preferably to 25 or more washing cycles.

According to still further features in the described preferred embodiments the article-of-manufacture is characterized by an after glow time, as defined by ASTM D 6413 12 seconds ignition test, of less than 100 seconds, preferably of less than 60 seconds.

According to still further features in the described preferred embodiments, such an after glow time remains substantially unchanged upon subjecting the article-of-manufacture to one or more washing cycles, more preferably, to five or more washing cycles, and even more preferably to 25 or more washing cycles.

According to still further features in the described preferred embodiments the article-of-manufacture is characterized by a char length, as defined by ASTM D 6413 12 seconds ignition test, of less than 25 centimeters, preferably of less than 17 centimeters.

According to still further features in the described preferred embodiments, such a char length remains substantially unchanged upon subjecting the article-of-manufacture to one or more washing cycles, more preferably, to five or more washing cycles, and even more preferably to 25 or more washing cycles.

According to still further features in the described preferred embodiments the flammable substrate in the article-of-manufacture is characterized by at least one aesthetical or textural property which is substantially the same as that of the flammable substrate per se. Preferably, such an aesthetical or textural property is selected from the group consisting of flexibility, smoothness, streakiness and color vivacity. Further preferably, these properties remain substantially unchanged upon subjecting the article-of-manufacture to one or more washing cycles, and more preferably, to five or more washing cycles, and even more preferably to 25 or more washing cycles.

According to still further features in the described preferred embodiments the article-of-manufacture is characterized in that the dry amount of the flame retardant formulation (dry add-on) is less than 35 weight percentages of the flammable substrate dry weight. Preferably, the dry add-on is less than 30 weight percentages of the flammable substrate dry weight. More preferably, the dry add-on is less than 25 weight percentages of the flammable substrate dry weight.

According to yet another aspect of the present invention there is provided a process of preparing a flame retardant formulation as described hereinabove, which is in the form of an aqueous dispersion, the process comprising providing a dispersion containing PBBBr granules, an aqueous solvent, a thickening agent and/or a dispersing agent; and milling the dispersion, to thereby obtain a plurality of PBBBr particles dispersed in the solvent.

According to still further features in the described preferred embodiments the thickening agent is carboxymethylcellulose.

According to still further features in the described preferred embodiments, the process further comprises, prior to or subsequent to the milling, adding to the dispersion at least one ingredient selected from the group consisting of an additional flame retardant, a fire retardant synergist, a binding agent, and an additional solvent.

According to still further features in the described preferred embodiments the process is conducted under basic pH.

According to yet an additional aspect of the present invention there is provided a process of applying any of the flame retardant formulations described hereinabove, to a textile substrate, the process comprising contacting the substrate with the flame retardant formulation described hereinabove.

According to still further features in the described preferred embodiments the contacting is effected by spreading, padding, foaming and/or spraying.

According to still further features in the described preferred embodiments the process further comprises, subsequent to the contacting, heating the substrate.

According to yet another aspect of the present invention there is provided a use of PBBBr as a flame retardant for application on a substrate.

According to still further features in the described preferred embodiments the PBBBr forms a part of a formulation which further comprises a carrier.

The present invention successfully addresses the shortcomings of the present configurations by providing a PBBBr-based flame retardant formulation which is far superior to the presently known FR formulations for application to textiles.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the term "comprising" means that other steps and ingredients that do not affect the final result can be added. This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

The term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the singular form "a," "an," and "the" include plural references unless the context clearly dictates otherwise. For example, the term "a compound" or "at least one compound" may include a plurality of compounds, including mixtures thereof.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

DESCRIPTION OF THE PREFERRED EMBODIMENTS

The present invention is of formulations of pentabromobenzylbromide (PBBBr), which can be used as flame retardant formulations for application on a substrate. More specifically, the PBBBr-containing formulations can be used as flame retardant formulations for application on textile fabrics while substantially maintaining the desired characteristics of the fabric. The present invention is thus further of articles-of-manufacture having these PBBBr formulations applied thereon, and of processes of preparing these formulations and of applying them onto various substrates.

Before explaining at least one embodiment of the invention in detail, it is to be understood that the invention is not limited in its application to the details of construction and the arrangement of the components set forth in the following description. The invention is capable of other embodiments or of being practiced or carried out in various ways. Also, it is to be understood that the phraseology and terminology employed herein is for the purpose of description and should not be regarded as limiting.

As discussed in detail in the Background section hereinabove, pentabromobenzylbromide (PBBBr) is a known brominated flame retardant (FR) containing both aromatic and aliphatic bromine atoms, and is therefore characterized by a broad temperature range for flame retardation.

PBBBr, as any FR, can be used either in the polymer melt, or as a coating. So far, the prior-art has only taught using it as a flame retardant, or a co-flame retardant, incorporated within the polymeric fiber in the melting process (see, WO 06/013554; WO 06/008738; JP 47,032,298). As is further discussed in detail hereinabove, incorporation of a FR in the polymeric fiber often results in degradation of the FR agent due to the high extrusion temperatures, may involve side reactions of the FR agent with the extruded fiber, and thereby modify fiber dyeability, fiber processability or other physical properties of the fiber, and increases the amount of FR to be used to achieve the desired flame retardancy properties.

The alternative method for applying flame retardants, which involves application on the textile substrate, is often limited due to the weak bonding between FRs in general, and brominated FRs in particular, and the fabric. Consequently, the FR may easily wash off the fabric during laundry, thus losing the acquired flame resistance effect, or necessitating the expensive and inconvenient dry-cleaning process. While extremely high amounts of binders, FRs and/or FR synergists are therefore needed to achieve acceptable levels of flame resistance and durability, degradation in the aesthetical and textural properties of the fabric are typically effected by these agents. Thus, for example, fabrics may become stiff and harsh, may have duller shades, poor tear strength and abrasion properties, and/or may develop streak marks on dark fabrics. In addition, the ignited fabric may drip excessively, and can be further characterized by high level of smoldering. Furthermore, brominated FR formulations often suffer from storage instability.

These shortcomings associated with brominated FRs when applied on the substrate surface, clearly explain why PBBBr has never been prepared as a part of a coating formulation, and has been only known to be directly incorporated into the polymeric fiber.

The present inventors have now surprisingly found that stable formulations of PBBBr could be made into efficient flame retardant formulations applied onto fabrics. Thus, these PBBBr formulations can, for the first time, be used as a fabric FR coating, while possessing an improved bonding with the fabric. This improved bonding between the FR and the fabric results in an improved washing fastness on one hand, and the ability to use only a minimal amount of binder, on the other hand. Hence, these formulations overcome the limitations associated with the use of flame retardants in the melt, and the limitations associated with the washing-instability of the previously-known brominated FR formulations.

Thus, as is demonstrated in the Examples section that follows, it was found that stable formulations of PBBBr are highly effective as flame retardant formulations when applied on textiles. As is further exemplified in the Examples section, the flame retardancy and washing fastness properties of the novel formulations were demonstrated with different types of fabrics. As is further demonstrated in the Experimental section which follows, these fabrics passed the acceptable washing fastness and flame retardancy tests, while attaining a low add-on and thus maintaining their aesthetical and textural properties.

Thus, according to one aspect of the present invention there is provided a flame retardant formulation which comprises pentabromobenzylbromide (PBBBr) and a carrier, for use as a flame retardant for application on a substrate. Preferably the formulation is packaged in a packaging material and is identified in print in or on the packaging material for use as a flame retardant for application on a substrate.

The term "carrier", as used herein, describes an inert material with which the composition is mixed or formulated to facilitate its application, or its storage, transport and/or handling. The carrier can be, for example, an organic carrier (e.g., alcohols, ketones, petroleum fractions, aromatic or paraffinic hydrocarbons, chlorinated hydrocarbons, or liquefied gases) or an aqueous carrier.

Since the flame retardant formulations described herein are particularly useful for the treatment of textiles, the carrier is preferably a textile acceptable carrier.

The term "textile acceptable carrier" as used herein refers to an inert, preferably environmentally acceptable carrier, which is not harmful to the textile.

Preferably, the carrier is an aqueous carrier and more preferably the carrier is water.

As used herein, the term "flame retardant", which is also termed herein, interchangeably, as "fire retardant", "flame resistant" and "fire resistant", describes a compound, a composition or a formulation which is capable of reducing or eliminating the tendency of a substance to ignite when exposed to a low-energy flame.

As used herein, the term "substrate" describes an article which has a surface that can be beneficially coated (either wholly or partially) with a flame retardant formulation. Exemplary articles include, without limitation, textiles, wood, furniture, toys, bricks, electrical appliances, electrical cables, plastics and more.

Preferable substrates onto which the flame retardant formulations described herein can be beneficially applied are textile fabrics. The textile fabrics can be synthetic, natural or a blend thereof. Non-limiting examples of textile fabrics that can be beneficially used in the context of the present invention include wool, silk, cotton, linen, hemp, ramie, jute, acetate fabric, acrylic fabric, latex, nylon, polyester, rayon, viscose, spandex, metallic composite, carbon or carbonized composite, and any combination thereof. Representative examples of textile fabrics which were shown to be suitable for use in the context of the present invention include, without limitation, cotton, polyester, and combinations thereof.

As is used herein, the term "flammable substrate" describes a substrate, as described hereinabove, that easily ignites when exposed to a low-energy flame. The flammability of different substrates or of articles-of-manufacture made of these substrates is typically tested and determined according to international standards. Representative examples include ASTM D-1230, a standard test method for flammability of apparel textiles; ASTM D-4151, a standard test method for flammability of blankets; ASTM D-4723, a standard index of and descriptions of textile heat and flammability test methods and performance specifications; ASTM D-4804, a standard test method for determining the flammability characteristics of non-rigid solid plastics; ASTM D-6545, a standard test method for flammability of textiles used in children's nightwear; ASTM D-777, standard test methods for flammability of treated paper and paperboard; ASTM D-1317, a standard test method for flammability of marine surface finishes; ASTM D-1955, a standard test method for flammability of sleeping bags; and ASTM D-6413, a standard test method for flame resistance of textiles (vertical test).

According to preferred embodiments of the present invention, the formulation described herein further includes a binding agent (also termed herein interchangeably as a "binder"). The use of a binder is necessary to adhere the molecules of a flame retardant, herein the pentabromobenzylbromide, to the substrate.

As discussed in detail hereinabove, brominated FRs are known as typically requiring a large amount of a binder to affix them to the textile substrate, which may typically reach about 50% by weight of the total FR formulation [Mischutin (1978) supra]. Such a large amount of a binder results in high add-on, which, as is further discussed in detail hereinabove, is undesirable since it causes a deterioration of the textile properties by, for example, stiffening the fabrics or fading of fabric shades, and may further lower the tear strength and abrasion properties of the fabric. Unfortunately, the high binder content also contributes in itself to flammability and dripping. Therefore when the binder is added in large amounts, yet higher amounts of the FR are needed, and as a result, more binder is needed to attach the extra FR to the substrate, thereby creating an endless cycle.

It has now been unexpectedly uncovered by the present inventors that the formulation described herein can be effectively applied on various substrates in the presence of relatively low concentrations of a binder.

While the exact amount of binder used depends on the flame retardant type and concentration, as well as on the fabric type onto which the formulation is applied, it has been shown that in the case of various textile substrates, the concentration of the binding agent in the formulations described herein can be lower than 20 weight percentages of the total weight of the formulation, preferably lower than 10 weight percentages of the total weight of the formulation and more preferably can be equal to or even lower than 5 weight percentages.

As is demonstrated in the Examples section that follows, it was found that PBBBr formulations containing 5 weight percentages of a binder were well adhered to the substrates, and remained such even upon subjecting the substrate to several washing cycles, while maintaining the flame resistance properties. Thus, for example, it has been demonstrated that a 100% Rib knitted cotton fabric having a PBBBr/an ammonium phosphate formulation that contains 5% by weight of a binder (see, Example 2) applied thereon, passed a 12 seconds ignition test (ASTM D 6413) with an after flame time of 0.56 seconds, an after glow time of 38 seconds, and a char length of 14.6 centimeters, even after 25 cycles of washing (see, Example 4).

The binder used in the formulations described herein is selected compatible with the flame retardants and the additional additives in the formulation.

In addition, a suitable binder is selected depending on the specific application. For example, different binders may be suitable to attach the FR formulation described herein to wood, plastic or textile. The binder can thus be selected from a large variety of materials, including, but not limited to, synthetic polymers, such as styrene-butadiene (SBR) copolymers, carboxylated-SBR copolymers, melamine resins, phenol-aldehyde resins, polyesters, polyamides, polyureas, polyvinylidene chloride, polyvinyl chloride (PVC), acrylic acid-methylmethacrylate copolymers, acetal copolymers, polyurethanes, mixtures thereof and cross-linked versions thereof.

Preferably, when the formulations described herein are applied on textiles, the binder is selected suitable for use on textiles, and is therefore selected to be both non-damaging to the aesthetical and textural properties of the fabric, and durable (to washing, drying, UV light etc.).

Representative examples of binders that are suitable for use on textiles include, without limitation, acrylates, polyurethanes, and PVC. Preferably, the binder used in the formulations described herein is an acrylate.

Examples of acrylates that are suitable for use as binders in the context of the present invention include, but are not limited to, 2-phenoxyethylacrylate, propoxylated 2 neopentyl glycol diacrylate, polyethylene glycol diacrylate, pentaerythritol triacrylate, 2-(2-ethoxyethoxy) ethyl acrylate, butyl acrylate, styrene, and others.

In addition to the PBBBr as a flame retardant, the carrier and optionally the binder, the formulations described herein may further comprise additional ingredients which may improve the performance of the formulation. Thus, in one embodiment, the PBBBr formulations can further comprise one or more of additional flame retardants, flame retardant synergists and smoldering suppressants. In a preferred embodiment, the FR formulation comprises up to ten flame retardants and/or flame retardant synergists.

As used hereinafter the term "smoldering", also known in the art as "after glow" refers to a burning which continues after the open flame has been extinguished.

The phrase "smoldering suppressant", which is also referred to herein interchangeably as "smoldering suppressing agent", therefore describes a compound or a composition which reduces or eliminates the tendency of a substance to burn after no longer being exposed to a flame.

Some of the presently known flame retardants may also exert smoldering suppression and are therefore further referred to as smoldering suppressants.

Formulations containing flame retardants and smoldering suppressants and/or flame retardants which are also smoldering suppressants can serve as flame retardant and smoldering suppressing formulations.

The flame retardants and smoldering suppressants added to the formulations described herein can be either halogenated flame retardants or non-halogenated flame retardants. Preferably, in cases where the FR formulation is intended to be applied on a textile fabric, the added flame retardants and smoldering suppressants are selected suitable for use on textiles, as detailed in the Background section hereinabove.

Examples of such suitable additional flame retardants include, but are not limited to, brominated flame retardants, chlorinated flame retardants, modacrylics, polyhaloalkenes, organophosphorus compounds, melamine, polyaramides, carbonized acrylics and glass. Preferably, the additional flame retardant is selected from brominated and chlorinated flame retardants. An example of a particularly preferred additional flame retardant, which is also known as a smoldering suppressant is decabromodiphenyloxide (DECA).

Examples of suitable smoldering suppressants include, but are not limited to urea, melamine and phosphate salts. In a preferred embodiment, the smoldering suppressant is an ammonium phosphate.

The phrase "ammonium phosphate" refers to an ammonium salt of a phosphate, whereby the phosphate can be a monophosphate, a diphosphate or a polyphosphate. Preferably, the phosphate is a polyphosphate.

The weight ratio between PBBBr and the additional flame retardant may range from about 1:50 to about 50:1, more preferably from about 1:10 to about 10:1. Most preferably, this ratio ranges from about 1:5 to about 5:1.

As used herein the term "about" refers to ±10%.

According to preferred embodiments of the present invention, the formulation described herein further comprises at least one fire retardant synergist, which acts in synergy with the PBBBr or with any other FR that is incorporated in the formulation described herein, and thus enhances the flame resistance properties of the formulation. An exemplary fire retardant synergist which is suitable for use in the context of the present invention is antimony oxide (AO), being, for example $Sb_2O_3$ and/or $Sb_2O_5$. The molar ratio between the fire retardant synergist and PBBBr preferably ranges from about 1:1 to about 1:10, and more preferably ranges from about 1:3 to about 1:6. As is detailed in the Background section hereinabove, large amounts of AO are undesirable due to cost, toxicity and environmental concerns. In commercial products, AO:FR ratios of 1:3 are common. Therefore, it is advantageous that in the present invention, due to the enhanced binding of the SS and/or FR to the substrate, the AO:FR ratio was lowered to half the commercial ratio, from a ratio of 1:3 to a ratio of 1:6 (see, Example 2).

The PBBBr-containing FR formulations described herein can further comprise additional ingredients that may stabilize the formulation, prolong its shelf-life and/or provide it with other desired properties such as certain viscosity, homogeneity, and adherence to the substrate.

Thus, according to another embodiment of the present invention, the formulation may yet further comprise one or more of such additional ingredients. These include, for example, surface active agents, wetting agents, dispersing agents, suspending agents, antifoaming agents, defoaming agents, preservatives, stabilizing agents, a pH buffer, binding agents, thickening agents and any mixture thereof.

The surface active agents and/or wetting agents can be nonionic and/or ionic (cationic or anionic) agents.

Examples of nonionic surface active and/or wetting agents that are suitable for use in the context of the present invention include, but are not limited to, polyoxyethylene (POE) alkyl ethers, preferably NP-6 (Nonylphenol ethoxylate, 6 ethyleneoxide units) such as DisperByk® 101.

Examples of anionic surface active and/or wetting agents that are suitable for use in the context of the present invention include, but are not limited to, free acids or organic phosphate esters or the dioctyl ester of sodium sulfosuccinic acid.

Examples of dispersing agents and/or suspending agents and/or thickening agents that are suitable for use in the context of the present invention include, but are not limited to, acrylic acids, acrylic acids ester copolymer neutralized sodium polycarboxyl such as naphthalene sulfonic acid-formaldehyde condensate sodium salt, alginates, cellulose derivatives and xanthan.

Examples of defoaming and/or antifoaming agents that are suitable for use in the context of the present invention, include, but are not limited to, mineral oil emulsions, natural oil emulsions, and preferably are silicon oil emulsions, such as AF-52.TM.

Examples of preserving or stabilizing agents that are suitable for use in the context of the present invention, include, but are not limited to, formaldehyde and alkyl hydroxy benzoates; preferably the preserving or stabilizing agents is a mixture of methyl and propyl hydroxy benzoates.

Additionally, a salt (e.g., ammonium phosphate or a borate) or an oxide (e.g., sodium silicate, alumina oxide, alumina oxide, aluminum hydrate) and any mixture thereof, may be added to the formulations of the present invention.

It has further been found that co-polymers derived from brominated and non-brominated monomers exhibit improved flame retardancy properties.

Thus, according to still further features in the described preferred embodiments, the smoldering suppressing formulation further comprises a brominated co-polymer. WO 05/070980 discloses flame-retardant products comprising a penta bromo methyl acrylate polymer and thus, preferably, the brominated co-polymer is a brominated polyacrylate.

As described in detail in the Background section hereinabove, it is generally known that compositions containing bromine are efficient flame retardants. However, many brominated FR compositions are unsatisfactory due to the instability of the compositions, which often lose their effectiveness after long-term shelving, due to thermal or other degradation.

The present inventors have now uncovered that an efficient application of PBBBr-containing FR formulations, according to the present embodiments, can be performed while utilizing an aqueous dispersion of micronized PBBBr. As is demonstrated in the Examples section that follows, formulations containing an aqueous dispersion of micronized PBBBr, either alone or in combination with other brominated flame retardants, are stable even during long-term shelving.

Thus, according to preferred embodiments of the present invention, in each of the formulations described herein, the PBBBr is utilized in a form of a dispersion, which comprises a plurality of PBBBr particles having an average size lower than 100 microns, dispersed in the formulation carrier. Preferably, the dispersion comprises PBBBr particles having an average size lower than 50 microns, more preferably lower than 30 microns, more preferably lower than 20 microns, more preferably lower than 10 microns and even more preferably lower than 5 microns. Preferred PBBBr dispersions according to the present embodiments comprise a plurality of PBBBr particles having an average size in the range of from about 0.1 microns to about 3 microns.

While as described hereinabove, a preferred carrier according to the present embodiments is an aqueous carrier and more preferably it is water, preferred formulations according to the present embodiments include an aqueous dispersion of micronized PBBBr.

Thus, according to another aspect of the present invention there is provided a process of preparing flame retardant formulations which comprise an aqueous dispersion of PBBBr. The process, according to this aspect of the present invention, is effected by providing a dispersion containing PBBBr granules, an aqueous solvent and a thickening agent and/or a dispersing agent; and milling the dispersion, to thereby obtain a plurality of PBBBr particles dispersed in the solvent. Any commonly used thickening agents and dispersing agents may be used. An exemplary thickening agent which was efficiently utilized in the preparation of DECA/PBBBr and PBBBr/ammonium phosphate dispersions is carboxymethylcellulose (see, for example, Example 2 in the Examples section that follows).

According to another embodiment of this aspect of the present invention, the process is conducted under basic pH conditions.

According to another embodiment of the process according to this aspect of the present invention, prior to or subsequent to the milling, there is added to the dispersion at least one ingredient selected from the group consisting of an additional flame retardant, a fire retardant synergist, a binding agent, and an additional solvent, as described hereinabove.

Consequently, as previously delineated, the formulations prepared by the process described herein, are characterized by an increased storage stability, being stable for at least two weeks at about room temperature, and often being stable for at least four weeks at that temperature. As is demonstrated in the Examples section that follows (see, for example, Examples 3 and 4), it was found that dispersions of PBBBr, prepared as described hereinabove, were left on shelf at ambient temperature for approximately 6 months and remained stable during this time period. It was further shown that dispersions of PBBBr are stable for at least a week when stored at elevated temperatures (e.g., above 30° C., or by following the "Tropical Storage Test", at 54° C.). It is to be understood that at temperatures below room temperature, the stability of the formulation described herein is even higher.

Thus, it has been demonstrated that the PBBBr formulations described herein are efficient flame retardants, which can be applied on textiles while utilizing relatively low concentrations of binders, while maintaining the desirable aesthetical, textural properties and flame retardancy properties of the fabric, even after extensive washing. Thus, these formulations can be efficiently used when applied on textiles, avoiding the need to use excessive amounts of the flame retardant, binders, synergists and other additives. Furthermore, these formulations are easily applied onto the textile substrate, while circumventing the need to use drastic conditions as in the methods for incorporating flame retardants in the melt (i.e. at high temperatures and under pressure, for example by extrusion or injection molding).

Thus, according to another aspect of the present invention there is provided a process of applying any of the flame retardant formulations described herein, to a substrate. The process, according to this aspect of the present invention, is effected by simply contacting the substrate with the flame retardant formulation, whereby the contacting can be effected by any industrially acceptable manner. Optionally, subsequent to contacting the FR formulation, the substrate is heated to a temperature of from 100° C. to 200° C., preferably about 160° C., whereby the temperature is dictated by the curing temperature of the binder. The industrially acceptable manner in which the contacting is effected includes, for example, spreading, padding, foaming and/or spraying the FR formulation onto the substrate. Padding is a process that is typically used for applying the formulation on a textile substrate and is defined as a process in which the fabric is first passed through a padder containing the FR formulation, and is then squeezed between heavy rollers to remove any excess formulation.

The process described herein can be effected, for example, either during the dying or the finishing stages of the substrate manufacture.

As is demonstrated in the Examples section that follows, the formulations and processes described herein were practiced so as to provide substrates having the FR formulation applied thereon. When the substrate is a textile substrate, it is characterized by enhanced flame retardancy, while still maintaining its aesthetical and textural properties.

The smoldering suppression and/or flame retardancy of the tested substrates were determined by methods acceptable in the industry, for example a 12 seconds ignition test, which is defined in ASTM D 6413, a test method used to measure the vertical flame resistance of textiles. Considering the results of the 12 seconds ignition test, a textile may be classified on a pass/fail basis, according to predetermined criteria, and varying with the application or use of the textile. For many purposes, a textile is considered to have failed the 12 seconds ignition test, if either its "after flame time" is longer than 3 seconds, or if its "after glow time" is longer than 100 seconds, or if its average "char length" exceeds 7 inches (17.8 cm) or an individual sample has a "char length" longer than 10 inches (25.4 cm). A fabric is considered to have a superior flame retardancy if all of the above criteria are met.

"After-flame time" is defined herein and in the art as the time period during which the sample continues to burn after removal of the burner. This term reflects the flame retardancy effectiveness, whereby a value lower than 3 seconds in the 12 seconds ignition test, is often acceptable. More preferably, a value lower than 2 seconds signifies a good flame retardancy, and a value lower than 1 second signifies an excellent flame retardancy.

"After-glow time" is defined herein and in the art as the time period during which the sample glows after the flame is extinguished. This term reflects the smoldering suppression effectiveness, whereby a value lower than 150 seconds in the 12 seconds ignition test, is sometimes acceptable. More preferably, a value lower than 100 seconds signifies a good smoldering suppression.

"Char length" is defined herein and in the art as the distance from the edge of the fabric that was exposed to the flame to the end of the area affected by the flame. A char is defined as a carbonaceous residue formed as the result of pyrolysis or incomplete combustion. This term reflects the combined smoldering suppression and flame retardancy effectiveness, whereby a value lower than 25 centimeters in the 12 seconds ignition test, is acceptable. More preferably, a value lower than 17 centimeters signifies a good smoldering suppression and flame retardancy.

Using this method, it was demonstrated, for example, that a bone-dry (as defined hereinafter the term "bone-dry" describes a substrate having zero percent moisture content) plain weave 50/50 cotton/polyester fabric, which was padded with a PBBBr/ammonium phosphate dispersion, according to preferred embodiments of the present invention, passed ASTM D 6413 12 seconds ignition test with no dripping, having an after flame time of 1 second, an after glow time of 23 seconds, and a char length of 15 centimeters (see, for example, Example 4 in the Examples section that follows). Similarly, a bone-dry 100% cotton fabric, which was padded with a PBBBr/DECA dispersion according to preferred embodiments of the present invention, passed ASTM D 6413 12 seconds ignition test with an after flame time of 0 seconds, an after glow time of 59 seconds, and a char length of 12.3 centimeters (see, for example, Example 5 in the Examples section that follows). Furthermore, a 100% Rib knitted cotton fabric which was padded with a PBBBr/ammonium phosphate dispersion according to preferred embodiments of the present invention, passed ASTM D 6413 12 seconds ignition with an after flame time of 0.56 seconds, an after glow time of 38 seconds, and a char length of 14.6 centimeters, even after being washed 25 times (see, Example 4). These results demonstrate the excellent flame retardancy properties obtained by applying the PBBBr formulations of the present embodiments on e.g., textile substrates.

Thus, according to another aspect of the present invention there is provided an article-of-manufacture which comprises a flammable substrate and any of the flame retardant formulations described herein, being applied thereon.

Due to the presence of the FR formulation presented herein, the article-of-manufacture is characterized by enhanced flame retardancy properties, which can be determined as described hereinabove.

Thus, the articles-of-manufacture according to the present embodiments are characterized by an after flame time of 2 seconds and less, preferably of 1.5 seconds and less and more preferably of 1 second or less; an after glow time of 100 seconds or less, preferably 80 seconds or less and more preferably of 60 seconds or less; and a char length of 20 centimeters or less and preferably of 15 centimeters or less.

As is further demonstrated in the Examples section that follows, when the FR formulations of the present embodiments was applied onto various textile fabrics, the flame resistance of the fabric, as defined by the "after flame time", "after glow time" and "char length", was maintained even after the fabric was contacted with hot water and a detergent, while being subjected to one or more washing cycles, as defined by Standard Laboratory Practice for Home Laundering (AATCC technical manual/2001). In fact, the flame resistance properties of textile fabrics treated with the PBBBr formulations described herein were maintained even after the treated fabric was subjected to 5, 10 and even 25 washing cycles.

Hence, it has been shown that the treated textile fabrics are further characterized by enhanced washing fastness.

The term "washing fastness", which is also referred to herein interchangeably as "washing durability" or "laundry stability", refers to the ability of a substrate treated with the PBBBr formulations of the present invention, to maintain its characteristic flame resistance and/or textural and/or aesthetical properties, after being subjected to at least one washing cycle, as defined by Standard Laboratory Practice for Home Laundering (AATCC technical manual/2001).

As is well acceptable, a textile is considered "durable" if it withstands five washing cycles without having remarkable change of a property thereof, whereby a textile is considered "semi durable" if it similarly withstands at least 1 washing cycle. Thus, the substrates treated with the formulations of the present embodiments were characterized by a washing fastness of five washing cycles, often exceeding 10 washing cycles, and in some cases exceeding 25 washing cycles. Hence, according to further embodiments of the present invention, the articles-of-manufacture described herein are characterized by washing fastness. This feature is particularly notable in view of the relatively low amount of the binder in the applied formulation.

Thus, according to a further embodiment of the present invention, the "after flame time", "after glow time" and "char length" properties, as defined hereinabove, of an article-of-manufacture having the FR formulation described herein applied thereon remain substantially unchanged upon subjecting the article-of-manufacture to one or more washing cycles, and even upon subjecting the article-of-manufacture to 5 or more, 10 or more and often for 25 or more washing cycles.

As used herein the term "substantially unchanged" refers to a change of less than 30%, preferably less than 20%, and more preferably less than 10% in the tested property.

As is further demonstrated in the Examples section that follows, it has been shown that upon applying the FR formulations described herein onto textile substrates, the substrates maintained other textural and aesthetical properties. Thus, it has been shown that textile substrates coated with the PBBBr formulation described herein were characterized by feel and appearance similar to those of a non-treated flammable substrate. Thus, for example, properties such as the flexibility, smoothness, color vivacity and streak-free look of a non-treated textile were maintained upon application of the FR formulation. Furthermore, these textural and aesthetical properties were maintained also upon subjecting the treated fabrics to several washing cycles.

Hence, according to another embodiment of the present invention, the article-of-manufacture described herein is further characterized by at least one aesthetical or textural property which is substantially the same as that of the flammable substrate per se.

The phrase "flammable substrate per se" as used herein, refers to a flammable substrate which was not treated with the FR formulation.

According to still another embodiment of the present invention, each of these properties remains substantially unchanged upon subjecting the article-of-manufacture to one or more washing cycles, preferably to five or more washing cycles and even to 10, 25 or more washing cycles.

As discussed in the Background section, it is extremely undesirable to apply on a textile a flame retardant formulation in large amounts (also termed "high add-on") since high additive concentrations on the dry fabric result in inferior fabric properties, as well as increased cost of production. Thus, it should be appreciated that the substrates treated with the formulations described herein are characterized by a relatively low dry add-on, demonstrating the advantageous use of these formulations. It is suggested that at least for preferred formulations according to the present embodiments, which comprise an aqueous dispersion of particulated PBBBr, the low dry add-on is obtained using micronized PBBBr at low binder concentration.

Hence, according to preferred embodiments of the present invention, the amount of a flame retardant formulation as presented herein is less than 35 weight percentages of the flammable substrate dry weight, preferably less than 30 weight percentages, and more preferably even less than 25 weight percentages of the dry weight of the flammable substrate. With regard to dry add-on calculation, the phrase "amount of a flame retardant formulation" refers to the amount of non-volatile components within the formulation, which remain on the fabric upon curing and drying. The dry add-on value is determined by calculating the difference in weight of the dry fabric before and after application of the flame retardant formulation.

Examples of non-volatile components within the flame retardant formulation, include, but are not limited to, flame retardant(s), binder(s) and/or synergist(s).

As a result, articles of manufacture, and particularly those having textile substrates, treated by the formulation described herein have superior properties compared with the presently known FR-treated products.

Exemplary articles-of-manufactures according to the present embodiments include any industrial product that comprises one or more flammable substrates and hence application of the FR formulation described herein thereon is beneficial. Such articles-of-manufacture include, for example, textiles, wood, furniture, toys, bricks, electrical appliances, electrical cables, plastics and more. Thus, for example, bricks or wooden articles, which are often used in building or as home furniture, can be easily coated with the FR formulation described herein, thus made flame resistant and applicable for home or industrial use. Electrical appliances and electrical cables are in severe danger of catching fire, being easily ignitable by an electric spark from within. It is advantageous to apply a coating on these electrical appliances and electrical cables, in an easy manner, and coating by the FR formulation described herein is therefore advantageous. Toys, textiles and plastics, are used in every field of life, and are often used by children. Therefore, fire proofing thereof is essential. Being cleaned and/or washed very frequently, it is imperative to use a FR agent that is washing durable, and will not wash off easily. Thus, the FR formulation described herein can be advantageously used for the fire-proofing of toys, textiles and plastics.

According to the presently most preferred embodiments of the present invention, the article-of-manufacture described herein comprises a flammable textile fabric.

The textile fabrics utilized according to embodiments of the present invention may be used as a single layer or as part of a multi-layer protective garment.

A textile substrate may be incorporated in various articles-of-manufacture, where it is desired to reduce the substrate flammability. Such products include, for example, draperies, garments, linen, mattresses, carpets, tents, sleeping bags, toys, decorative fabrics, upholsteries, wall fabrics, curtains and technical textiles. Technical textiles are textiles used in industrial, automotive, construction, agricultural, aerospace, hygiene and similar applications.

As discussed in the Background section hereinabove, textile flammability and textile smoldering are major concerns since textiles are used in all fields of life. Some textile articles of manufacture, such as garments, linen and some decorative or technical textiles, are subject to harsh usage (abrasion, exposure to various environmental conditions etc.) and therefore may need extensive, sometimes daily, cleaning and washing. So far, fire proofing these articles of manufacture involved either using the few available non-flammable fabrics; coating flammable fabrics with large amounts of FR, thus often damaging the fabric properties; or applying low amounts of FR on the flammable fabric, but limiting its cleaning method to the expensive and burdensome dry cleaning method. Using the FR formulation presented herein, these garments or technical textiles may be fire proofed while maintaining the feel and look of the fabric, as a result of applying relatively small amounts of the formulation. Other types of articles-of-manufacture, such as draperies, carpets, tents, sleeping bags, toys, wall fabrics, decorative fabrics, mattresses and upholsteries, are not washed as much as garments or linen. However, the major hazards that can be caused by the inherent flammability of these articles call for efficient fire proofing thereof, in addition to their durability during periodic cleaning. These articles of manufacture may easily be made fire proof, either by using a fabric treated by the formulation described herein during the manufacturing process, or by easily applying these formulations onto the final product.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples which, together with the above descriptions, illustrate the invention in a non limiting fashion.

Materials and Analytical Methods

Materials:

Decabromodiphenyloxide (DECA, CAS 1163-9-5) and PBBBr granules, having an average particle size of $d_{50}$=98 microns were obtained from ICL-IP.

CELLOSIZE HEC QP-100MH (thickener) and Triton reagent were obtained from DOW.

Antimony trioxide (AO, CAS No. 1309-64-4) was obtained from Campine Belgium.

AC-200 W binder and GP acrylic thickening agent were obtained from B. G. Polymers.

Instrumental data:

Viscosity was determined using a Brookfield viscometer, model-LVTD spindle 2 RPM 60.

Flammability tests:

ASTM D 6413 12 seconds ignition test: In this method, samples are cut from the fabric to be tested, and are mounted in a frame that hangs vertically from inside the flame chamber. A controlled flame is exposed to the sample for a specified period of time (in this case for 12 seconds, one of the strictest flammability tests), and the "after-flame time" and the "after-glow time" are both recorded. Finally, the sample is torn by use of weights and the char length is measured. To pass, the average char length of five samples cannot exceed 7 inches (17.8 cm). In addition, none of the individual specimens can have a char length of 10 inches (25.4 cm). The sample is further classified as passing the test if its "after flame time" is less than 3 seconds, and its "after glow time" is less than 100 seconds, so as to render the sample applicable even in the stricter "children's nightwear" flammability standards.

Washing Fastness Tests:

Samples treated with the flame retardant formulations described herein were subjected to between 1 and 25 successive washing cycles in accordance with the washing procedure set forth below, followed by one drying cycle in accordance with commonly used drying procedure, based on the Standard Laboratory Practice for Home Laundering (AATCC technical manual/2001).

In all washing cycles, the temperature of the washing water is maintained between 58° C. and 62° C., for automatic washing machines, the washing cycle is set for normal washing cycle and a synthetic detergent that conforms to Standard Laboratory Practice for Home Laundering (AATCC technical manual/2001) is used.

Example 1

Preparation of a PBBBr Micronized Dispersion

Pentabromobenzylbromide (PBBBr) granules having a large particle size of $d_{50}$=98 microns (1 Kg) were gradually added to a mixed solution of deionized water (1.5 Kg) containing the thickening agent Triton X-100 (20 grams). The mill base was ground by a ball mill, using ceramic balls of 0.8 mm, at 200-300 rpm. The milling continued for 2 hours to achieve a particle size around $d_{50}$=2 microns. 35% by weight dry solids were obtained in the milled product after grinding.

Example 2

Preparation of a PBBBr/an Ammonium Phosphate Dispersion

A PBBBr-ammonium phosphate dispersion was prepared by adding to 147 grams of the micronized dispersion of PBBBr (containing 50 grams PBBBr) prepared as described in Example 1, deionized water (278 grams), $Sb_2O_3$ (25 grams) and an acrylic binder (50 grams). A an ammonium phosphate, such as described in a provisional application, by the present assignee, having Attorney Docket No. 30273, co-filed on the same date as the instant application and entitled "Washing-Fast Smoldering-Suppressant Compositions", which is incorporated by reference as if fully set forth herein, prepared according to Example 1 therein, (76 grams, 16% by weight solids) was then added to the dispersion. The pH of the dispersion was adjusted to 9 using ammonium hydroxide, and the dispersion was thickened by adding a small amount of carboxymethylcellulose (1.7 grams). A smooth, white and fluid dispersion was obtained. The dispersion was left on shelf at ambient temperature for approximately 6 months and remained stable during this period. The dispersion was characterized as appears in Table 1 below.

TABLE 1

Dispersion typical properties

| | |
|---|---|
| Viscosity (cP) | 280 |
| Dry solids (wt %) | 22 |
| pH | 8 |
| PBBBr (wt %) | 8.7 |
| Br (wt %) | 7.3 |
| ammonium phosphate (wt %) | 1.7 |
| $Sb_2O_3$ (wt %) | 4.4 |
| binder (wt %) | 5.0 |

Example 3

Preparation of a Dispersion of PBBBr/Decabromodiphenyloxide (DECA) Dispersion

A PBBBr-decabromodiphenyloxide (DECA) dispersion containing 50 grams PBBBr, 50 grams DECA, 50 grams $Sb_2O_3$ and 15 grams of a binder was prepared according to the procedure outlined in Example 2. A smooth, white and fluid dispersion was obtained. The dispersion was left on shelf at ambient temperature for approximately 6 months and remained stable during this period. The dispersion was characterized as appears in Table 2 below.

TABLE 2

Dispersion typical properties

| | |
|---|---|
| Viscosity (cP) | 400 |
| Dry solids (wt %) | 17 |
| pH | 8 |
| FR mix (wt %) | 9.8 |
| Br (wt %) | 8.2 |
| $Sb_2O_3$ (wt %) | 4.9 |
| binder (wt %) | 5 |

Example 4

Application of PBBBr Dispersions to Textiles

Application of PBBBr/ammonium phosphate dispersion on 100% cotton fabric: 100% Rib knitted cotton fabric weighing 216 grams/m² was padded with the PBBBr/ammonium phosphate dispersion prepared according to Example 2 above. Curing and fixation were performed at 160° C. Table 3 below presents the weight of the various components in the dispersion applied on the fabric, expressed as weight percentages:

TABLE 3

| Additive | Weight Percentages |
|---|---|
| Add-on | 31.6 |
| PBBBr | 12.5 |
| Br | 10.5 |
| an ammonium phosphate | 2.4 |
| $Sb_2O_3$ | 6.3 |

The cotton fabric was washed according to Standard Laboratory Practice for Home Laundering (AATCC technical manual/2001), repeating the washing process 25 times. The washed fabric passed ASTM D 6413 12 seconds ignition with an after flame time of 0.56 seconds, an after glow time of 38 seconds, and a char length of 14.6 centimeters.

Application of a PBBBr dispersion to a 50/50 cottonlpolyester fabric: Plain weave 50/50 cotton/polyester fabric weighing 100 grams/m² was padded with PBBBr/CaASP dispersion prepared according to Example 2 above. Curing and fixation were performed at 160° C. The dry add-on was determined to be 22.9% by weight, with the bone-dry fabric passing ASTM D 6413 12 seconds ignition test with no dripping, having an after flame time of 1 second, an after glow time of 23 seconds, and a char length of 15 centimeters. The dispersion was characterized as appears in Table 4 below.

TABLE 4

| Additive | Weight Percentages |
|---|---|
| Add-on | 22.9 |
| PBBBr | 14.9 |
| Br | 12.5 |
| $Sb_2O_3$ | 7.5 |

Example 5

Application of PBBBr/DECA Dispersions to Textiles

A 100% cotton fabric weighing 216 grams/m² was padded with the dispersion prepared as described in Example 3 above. Curing and fixation were performed at 160° C. The dry add-on was determined to be 24.5% by weight, with the bone-dry fabric passing ASTM D 6413 12 seconds ignition test with an after flame time of 0 seconds, an after glow time of 59 seconds, and a char length of 12.3 centimeters. The dispersion was characterized as appears in Table 5 below.

TABLE 5

| Additive | Weight Percentages |
|---|---|
| Add-on | 24.5 |
| FR mixture | 11.9 |
| Br | 10.5 |
| $Sb_2O_3$ | 7.1 |

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A formulation comprising pentabromobenzylbromide (PBBBr) and a carrier, the formulation being packaged in a packaging material and identified in print in or on said packaging material for use as a flame retardant for application on a substrate.

2. The formulation of claim 1, further comprising a binding agent.

3. The formulation of claim 2, wherein a concentration of said binding agent is less than 20 weight percentages of the total weight of the formulation.

4. The formulation of claim 1, further comprising at least one additional flame retardant and/or smoldering suppressant.

5. The formulation of claim 4, wherein said additional smoldering suppressant is an ammonium phosphate.

6. The formulation of claim 4, wherein said additional flame retardant and/or said smoldering suppressant is decabromodiphenyloxide (DECA).

7. The formulation of claim 4, wherein a ratio between PBBBr and said additional flame retardant and/or smoldering suppressant ranges from about 1:50 and 50:1.

8. The formulation of claim 1, further comprising at least one fire retardant synergist.

9. The formulation of claim 8, wherein said at least one additional fire retardant synergist is antimony oxide (AO).

10. The formulation of claim 8, wherein a molar ratio between said fire retardant synergist and PBBBr ranges from 1:1 to 1:10.

11. The formulation of claim 1, further comprising at least one additional ingredient selected from the group consisting of a surface active agent, a wetting agent, a thickening agent, a suspending agent, an antifoaming agent, a preservative, a stabilizing agent, a pH buffer, a binding agent, a thickening agent, a salt, an oxide and any mixture thereof.

12. The formulation of claim 1, wherein said carrier is selected from the group consisting of an aqueous carrier, an organic carrier and a combination thereof.

13. The formulation of claim 1, wherein said carrier is an aqueous carrier.

14. The formulation of claim 13, being in a form of a dispersion.

15. The formulation of claim 14, wherein said dispersion comprises a plurality of PBBBr particles having an average size lower than 100 microns.

16. The formulation of claim 15, wherein said average size ranges from about 0.1 microns to about 3 microns.

17. The formulation of claim 1, wherein said substrate comprises a textile fabric.

18. An article-of-manufacture comprising a flammable substrate and the flame retardant formulation of claim 1 being applied thereon.

19. The article-of-manufacture of claim 18, wherein said substrate comprises a textile fabric.

20. The article-of-manufacture of claim 18, characterized by an after flame time, as defined by ASTM D 6413 12 seconds ignition test, of less than 2 seconds.

21. The article-of-manufacture of claim 20, wherein said after flame time remains substantially unchanged upon subjecting said article-of-manufacture to at least 1 washing cycle.

22. The article-of-manufacture of claim 21, wherein said after flame time remains substantially unchanged upon subjecting said article-of-manufacture to at least 25 washing cycles.

23. The article-of-manufacture of claim 18, characterized by an after glow time, as defined by ASTM D 6413 12 seconds ignition test, of less than 100 seconds.

24. The article-of-manufacture of claim 23, wherein said after glow time remains substantially unchanged upon subjecting said article-of-manufacture to at least 1 washing cycle.

25. The article-of-manufacture of claim 24, wherein said after glow time remains substantially unchanged upon subjecting said article-of-manufacture to at least 25 washing cycles.

26. The article-of-manufacture of claim 18, characterized by a char length, as defined by ASTM D 6413 12 seconds ignition test, of less than 25 centimeters.

27. The article-of-manufacture of claim 26, wherein said char length remains substantially unchanged upon subjecting said article-of-manufacture to at least 1 washing cycle.

28. The article-of-manufacture of claim 27, wherein said char length remains substantially unchanged upon subjecting said article-of-manufacture to at least 25 washing cycles.

29. The article-of-manufacture of claim 18, being characterized by at least one, aesthetical or textural property which is substantially the same as that of said flammable substrate per se.

30. The article-of-manufacture of claim 29, wherein said property remains substantially unchanged upon subjecting said article-of-manufacture to at least 1 washing cycle.

31. The article-of-manufacture of claim 30, wherein said property remains substantially unchanged upon subjecting said article-of-manufacture to at least 25 washing cycles.

32. The article-of-manufacture of claim 18, wherein an amount of said flame retardant formulation (dry add-on) is less than 35 weight percentages of said flammable substrate dry weight.

33. The article-of-manufacture of claim 32, wherein said amount is less than 30 weight percentages of said flammable substrate dry weight.

34. A process of preparing the flame retardant formulation of claim 14, the process comprising:
providing a dispersion containing PBBBr granules, an aqueous solvent and a thickening agent and/or a dispersing agent; and
milling said dispersion to thereby obtain a plurality of PBBBr particles dispersed in said solvent.

35. The process of claim 34, wherein said thickening agent is carboxymethylcellulose.

36. The process of claim 34, wherein an average size of said PBBBr particles is lower than 100 microns.

37. The process of claim 34, further comprising, prior to or subsequent to said milling:
adding to said dispersion at least one ingredient selected from the group consisting of an additional flame retardant, a smoldering suppressant, a fire retardant synergist, a binding agent, and an additional solvent.

38. A process of applying the flame retardant formulation of claim 1 to a textile substrate, the process comprising contacting the substrate with the flame retardant formulation.

39. The process of claim 38, further comprising, subsequent to said contacting, heating the substrate.

* * * * *